Dec. 16, 1952  B. D. BARTON  2,621,870
HOSE REEL ASSEMBLY

Filed Jan. 16, 1950  2 SHEETS—SHEET 1

INVENTOR.
Benjamin D. Barton
BY
Otis A. Earl
Attorney.

Dec. 16, 1952     B. D. BARTON     2,621,870
HOSE REEL ASSEMBLY

Filed Jan. 16, 1950     2 SHEETS—SHEET 2

INVENTOR.
Benjamin D. Barton
BY
Attorney.

Patented Dec. 16, 1952

2,621,870

UNITED STATES PATENT OFFICE 2,621,870

HOSE REEL ASSEMBLY

Benjamin D. Barton, Battle Creek, Mich., assignor to American Marsh Pumps, Inc., Battle Creek, Mich.

Application January 16, 1950, Serial No. 138,818

13 Claims. (Cl. 242—87)

This invention relates to improvements in hose reel assembly.

The main objects of this invention are:

First, to provide a hose reel assembly well adapted for mounting on a truck or other suitable vehicle which permits hose to be drawn off at either or both sides of the truck and independently wound upon its reel.

Second, to provide a hose reel assembly of this character including a motor in which the reels may be simultaneously or independently driven and one in which the control switch of the motor is automatically closed upon the actuation of the control means for the driving connections of either reel.

Third, to provide a structure having these advantages which is comparatively simple, yet sturdy in its parts and assembled as a unit and may be mounted as a unit on a truck or vehicle.

Objects relating to details and economies of the invention will appear from the description to follow. The invention is pointed out in the claims.

A preferred embodiment of the invention is illustrated in the accompanying drawings, in which.

Figure 1:
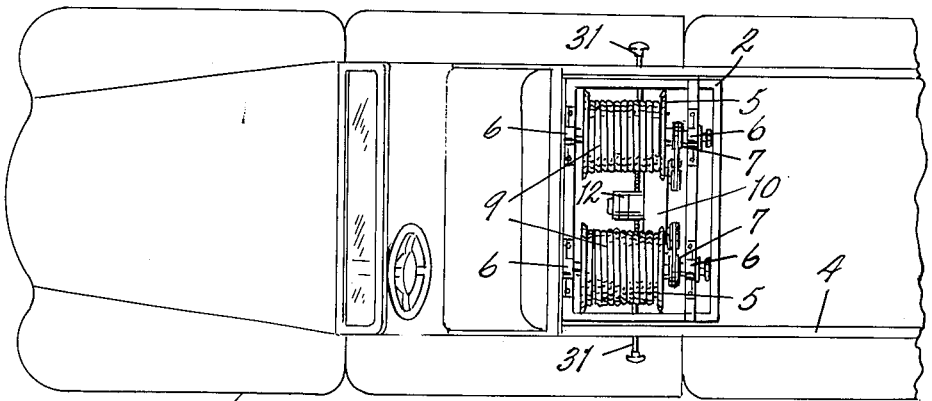
Fig. 1 is a fragmentary plan view of a motor vehicle, such as a fire apparatus truck, mainly shown conventionally with the hose reel assembly of my invention mounted thereon.
Figure 2:
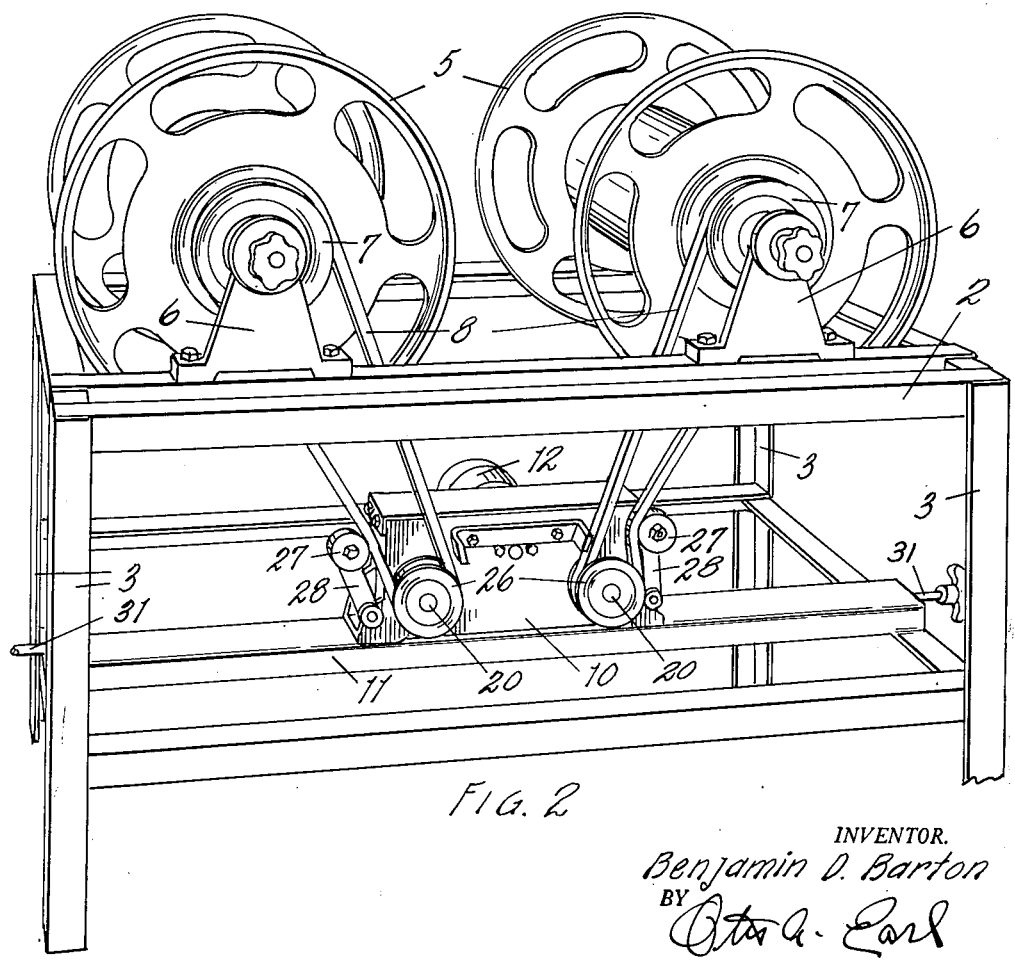
Fig. 2 is a perspective view of the hose reel assembly of my invention, one of the supporting legs being partially broken away.

In the accompanying drawing 1 designates a motor vehicle or fire apparatus truck. The hose reel assembly of my invention is mounted thereon and comprises a frame designated generally by the numeral 2 and made up of suitable structural elements arranged to support the several operating parts and provided with legs 3. I do not describe the details of this frame or the manner of connecting the parts thereof as such details form no part of this invention. Desirably the structural parts are joined by welding. The frame is of such dimensions that it can be mounted transversely of the body 4 of the truck. The hose reels 5 are mounted in suitable pedestal bearings 6 on the frame and are provided with pulleys 7 with which the belts 8 coact.

In Fig. 1, I indicate hose 9 wound upon the reels. Below the reels I mount a transmission or gearbox 10, this being mounted on a bar 11 disposed longitudinally of the frame. The electric motor 12 is mounted on one side of this gearbox and the driving shaft 13 suitably connected to the rotor projects into the gearbox and is provided with a worm gear 14. A jackshaft 15 is mounted in suitable bearings 16 carried by the crosspieces 17 within the gearbox and is provided with a worm gear 18 meshing with the gear 14. The jackshaft is provided with outwardly facing beveled gears 19.

Figure 3:
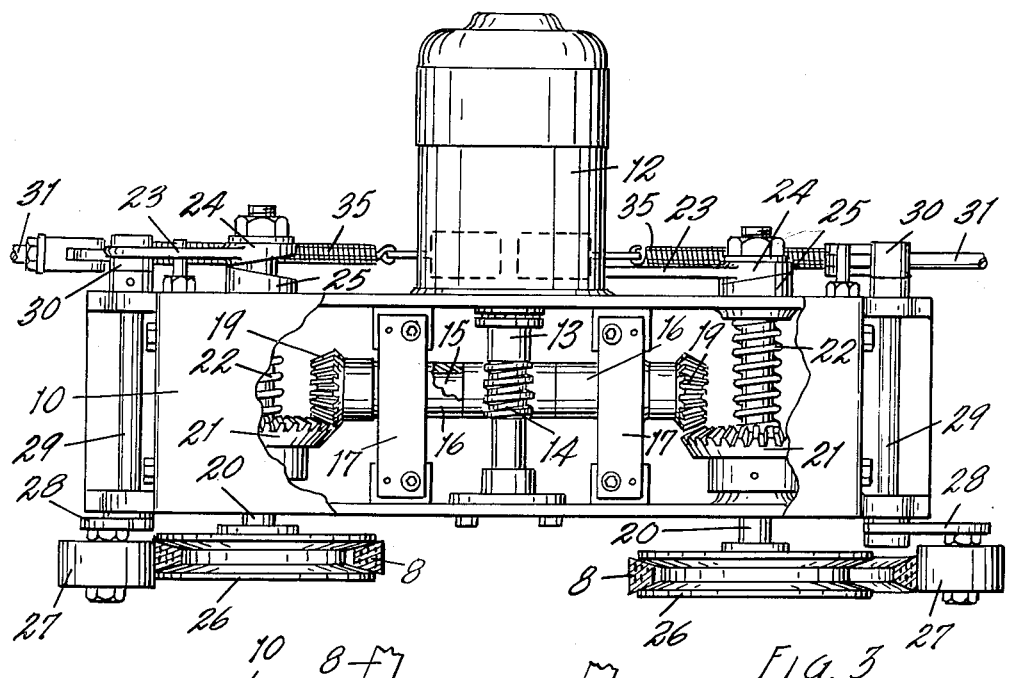
Fig. 3 is a fragmentary view partially broken away and partially in section showing details of the transmission and its relation to the motor, one of the driven gears being in engaged position and the other in disengaged position.
Figure 4:
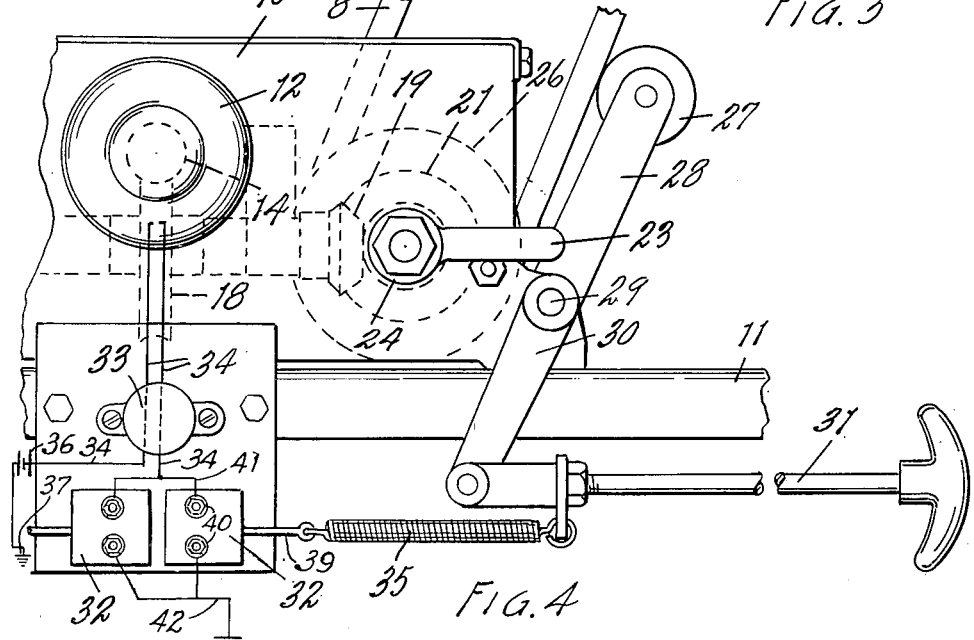
Fig. 4 is an enlarged fragmentary elevational view of portions of the mechanism shown in Fig. 3.

Adjacent the ends of the gearbox and transversely thereof I mount driven shafts 20 for axial adjustment. These driven shafts are provided with beveled gears 21 selectively engageable with the gears 19 on the jackshafts. Coil springs 22 on the shaft 20 urge or bias them to gear disengaging position. The shafts 21 are manually shifted to gear engaging position by means of the levers 23 which are provided with cams 24 coacting with the fixed cams 25 on the gearbox as is clearly shown in Fig. 3 in which one lever 23 is in actuated position and the other is in unactuated position. The shafts 20 are provided with pulleys 26 coacting with the belts 8 and driving the reels through these belts when the belts are subjected to driving tension by means of the belt tightening pulleys 27. These belt tightening pulleys are carried by the arms 28 on the rockshafts 29. The rockshafts 29 have arms 30 thereon disposed oppositely of the arms 28 and to which the control rods 31 are connected as best shown in Fig. 4. These control rods are desirably disposed through opposite sides of a truck body as is shown in Fig. 1. With this arrangement the motor may be drivingly connected to either reel or as desired.

Figure 5:
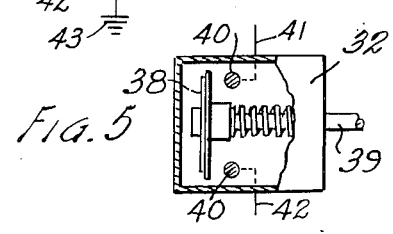
Fig. 5 is a view mainly conventionalized of one of the self-opening motor control switches.

The motor is controlled by the switches indicated generally by the numeral 32 conventionally shown in Fig. 4, these being connected in parallel to the conductor 34 which extends to the motor 12 and from the motor to the battery 36 grounded at 37. The member 33 constitutes means for supportingly retaining the conductor to the bar 11 of the frame 2, and if desired, obviously may include a switch (not shown) in the conductor 34. The specific construction of the member 33 constituting no part of applicant's invention is not further illustrated. In Fig. 5

I illustrate a switch of the automatically opening type which includes a movable contact 38 operable by means of the rod 39 to electrically connect the two stationary contacts 40, the upper of which is connected by conductor 41 to the conductor 34 as shown in Fig. 4, and the lower of which is connected to the conductor 42 grounded at 43 as shown in the same figure; this, however, is also conventionally illustrated. Each switch is connected as by means of a rod 39 and an extension spring 35 to one of the control members 31 so that when either one of the control members is actuated to effect the driving connection for the motor to its corresponding reel the switch is closed and the current supplied to the motor. The source of current may be a battery 36 as shown in Fig. 4 or a direct connection to the vehicle motor generator (not shown).

It will be understood that fire trucks of this type are commonly provided with pumping equipment which I have not illustrated. One suitable pumping apparatus is illustrated in my Patent No. 2,372,308, issued March 27, 1945.

In this embodiment of my invention, when the belt tightener pulleys are in retracted position or in disengaged position the hose may be pulled freely from its reel which is free to revolve. When it is desired to wind the hose it is only necessary to actuate its corresponding control rod, the actuation of which starts the motor. It will be understood, of course, that to permit free rotation of the reel the corresponding driven gear 21 must be disengaged from the jackshaft gear as is shown at the right of Fig. 3 and to wind the hose the gear 21 must be engaged as shown at the left of Fig. 3.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. In a hose reel assembly, the combination of a frame, reels rotatably mounted on said frame and provided with pulleys, a gear box mounted on said frame below said reels, a driving shaft projecting into the gearbox and provided with a worm gear, a driving motor the driving shaft mounted on said gearbox, a jackshaft disposed within said gearbox transversely of said driving shaft and provided with a gear coacting with said worm gear thereon, oppositely facing beveled gears on said jackshaft, driven shafts disposed transversely of said gearbox and of said jackshaft and provided with beveled driven gears coacting with the gears on said jackshaft, said driven shafts being axially shiftable to engage and disengage said gears thereon with said beveled gears on said jackshaft, springs on said driven shafts biased to shift the gears thereon to disengaged position, means for manually shifting said driven shafts to engage said gears, pulleys on said driven shafts, belts connecting said pulleys on said driven shafts to said pulleys on said reels, belt tightener rockshafts provided with arms having pulleys thereon coacting with said belts, control rods operatively connected to said rockshafts, automatically opening motor control switches connected to said motor in parallel, and extension springs connecting said switches to said control rods whereby when the control rods are actuated to actuate the belt tighteners the switches are closed.

2. In a hose reel assembly, the combination of a frame, reels rotatably mounted on said frame and provided with pulleys, a gear box mounted on said frame below said reels, a driving shaft projecting into the gearbox and provided with a worm gear, a driving motor the driving shaft mounted on said gearbox, a jackshaft disposed within said gearbox transversely of said driving shaft and provided with a gear coacting with said worm gear thereon, oppositely facing beveled gears on said jackshaft, driven shafts disposed transversely of said gearbox and of said jackshaft and provided with beveled driven gears coacting with the gears on said jackshaft, said driven shafts being axially shiftable to engage and disengage said gears thereon with said beveled gears on said jackshaft, springs on said driven shafts biased to shift the gears thereon to disengaged position, means for manually shifting said driven shafts to engage said gears, pulleys on said driven shafts, belts connecting said pulleys on said driven shafts to said pulleys on said reels, manually actuated belt tightener means for said belts, control switches for said motor, and connections for said manually actuated tightener means to said switches.

3. In a hose reel assembly, the combination of a frame, reels rotatably mounted on said frame and provided with pulleys, a gearbox mounted on said frame below said reels, a driving shaft projecting into the gearbox and provided with a worm gear, a driving motor therefor mounted on said gearbox, a jackshaft disposed within said gearbox transversely of said driving shaft and provided with a gear coacting with said worm gear thereon, oppositely facing beveled gears on said jackshaft, driven shafts disposed transversely of said gearbox and of said jackshaft and provided with beveled driven gears engageable with the gear on said jackshaft, said driven shafts being axially shiftable to engage and disengage said gears thereon with said beveled gears on said jackshaft, springs on said driven shafts biased to shift the gears thereon to disengaged position, means for manually shifting said driven shafts to engage said gears, pulleys on said driven shafts, belts connecting said pulleys on said driven shafts to said pulleys on said reels, manually actuated belt tighteners for said belts, and motor control switches for said motor operatively associated with said belt tightening means to be actuated to closed position on the actuation of the belt tightening means.

4. In a hose reel assembly, the combination of a frame, reels rotatably mounted on said frame and provided with pulleys, a gearbox mounted on said frame below said reels, a driving shaft projecting into the gearbox and provided with a worm gear, a driving motor therefor mounted on said gearbox, a jackshaft disposed within said gearbox transversely of said driving shaft and provided with a gear coacting with said worm gear thereon, oppositely facing beveled gears on said jackshaft, driven shafts disposed transversely of said gearbox and of said jackshaft and provided with beveled driven gears engageable with the gear on said jackshaft, pulleys on said driven shafts, belts connecting said pulleys on said driven shafts to said pulleys on said reels, manually actuated belt tighteners for said belts, and motor control switches for said motor operatively associated with said belt tightening means to be actuated to closed position on the actuation of the belt tightening means.

5. In a hose reel assembly, the combination of a frame, reels rotatably mounted on said frame and provided with pulleys, a gearbox mounted on said frame below said reels, a driving shaft projecting into the gearbox and provided with a worm gear, a jackshaft disposed within said gearbox transversely of said driving shaft and provided with a gear coacting with said worm gear thereon, oppositely facing beveled gears on said jackshaft, driven shafts disposed transversely of said gearbox and of said jackshaft and provided with beveled driven gears engageable with the gear on said jackshaft, said driven shafts being axially shiftable to engage and disengage said gears thereon with said beveled gears on said jackshaft, springs on said driven shafts biased to shift the gears thereon to disengaged position, means for manually shifting said driven shafts to engage said gears, pulleys on said driven shafts, belts connecting said pulleys on said driven shafts to said pulleys on said reels, and manually actuated belt tighteners for said belts.

6. In a hose reel assembly, the combination of a frame, reels rotatably mounted on said frame and provided with pulleys, a gearbox mounted on said frame below said reels, a driving shaft projecting into the gearbox and provided with a worm gear, a jackshaft disposed within said gearbox transversely of said driving shaft and provided with a gear coacting with said worm gear thereon, oppositely facing beveled gears on said jackshaft, driven shafts disposed transversely of said gearbox and of said jackshaft and provided with beveled driven gears engageable with the gear on said jackshaft, pulleys on said driven shafts, belts connecting said pulleys on said driven shafts to said pulleys on said reels, and manually actuated belt tighteners for said belts.

7. In a hose reel assembly, the combination of hose reels, a driving motor for said reels, disengageable driving connections from said motor to each of said reels, means for manually engaging and disengaging said driving connections to each reel, automatically opening motor control switches connected to said motor in parallel, and operating connections from said engaging and disengaging means to said switches including springs whereby when either of said engaging and disengaging means is actuated to connect the motor with a reel one of said switches is closed.

8. In a hose reel assembly, the combination of hose reels, an electric driving motor for said reels, disengageable driving connections from said motor to each of said reels, means for manually engaging and disengaging said driving connections to each reel, motor control switches for said motor, and operating connections from said engaging and disengaging means to said switches whereby when either engaging and disengaging means is actuated to operatively connect the motor to a reel one of said switches is closed.

9. A hose reel assembly comprising a reel provided with a pulley, a motor, a transmission comprising a driven shaft having manually controllable driving connections with the motor, a pulley on said driven shaft, a belt connecting said pulley on said driven shaft to said pulley on said reel, a belt tightener rockshaft having a pulley thereon coacting with said belt, a control rod connected to said rockshaft, a motor control switch connected to said motor, and a spring connection for said control rod to said switch whereby when the control rod is actuated to actuate the belt tightener the switch is closed.

10. A hose reel assembly comprising a reel provided with a pulley, a motor, a transmission comprising a driven shaft having manually controllable driving connections with the motor, a pulley on said driven shaft, a belt connecting said pulley on said driven shaft to said pulley on said reel, a belt tightener, a control member for said belt tightener, a motor control switch connected to said motor, and an operating connection for said control member to said switch whereby when the control member is actuated to actuate the belt tightener the switch is closed.

11. In a hose reel assembly, the combination of rotatably mounted hose reels provided with pulleys, a driving motor, transmission means for said motor to said reels comprising driven pulleys, belts connecting said driven pulleys to said pulleys on said reels, belt tightener rockshafts provided with pulleys coacting with said belts, means for manually actuating the rockshafts to actuate the tightener pulleys, control switches for said motor, and operative connections for said control switches to said belt tightener actuating means whereby the switches are closed when the belt tightener actuating means is actuated.

12. In a hose reel assembly, the combination of a rotatably mounted hose reel provided with a pulley, a driving motor, transmission means for said motor to said reel comprising a driven pulley, a belt connecting said driven pulley to said pulley on said reel, a belt tightener coacting with said belt, means for manually actuating the belt tightener, a control switch for said motor, and an operative connection for said control switch to said belt tightener actuating means whereby the switch is closed when the belt tightener actuating means is actuated.

13. In a hose reel assembly, a frame adapted to be mounted on the body of a truck, reels mounted for rotation on said frame with their axes of rotation disposed approximately horizontally and spaced approximately horizontally from each other, driving means for said reels mounted on said frame beneath said reels and disposed approximately midway of the vertical planes of the axes of rotation of the reels, an engageable and disengageable driving connection from said driving means to each reel, and manually operable means disposed for engaging and disengaging the driving connection to each reel.

BENJAMIN D. BARTON.

REFERENCES CITED

The following references are of record in the file of this patent:

UNITED STATES PATENTS

| Number | Name | Date |
| --- | --- | --- |
| 562,745 | Smith | June 23, 1896 |
| 1,499,644 | Dowrelio | July 1, 1924 |
| 1,695,857 | Proctor | Dec. 18, 1928 |
| 1,843,650 | Schlicker | Feb. 2, 1932 |
| 2,139,484 | Baird | Dec. 6, 1938 |
| 2,368,293 | Garancher | Jan. 30, 1945 |